(12) United States Patent
Weber

(10) Patent No.: US 7,621,548 B2
(45) Date of Patent: Nov. 24, 2009

(54) BICYCLE-MOUNTED GOLF CLUB CARRYING SYSTEM, COMBINATION WITH A BICYCLE HAVING EXTRA-WIDE TIRES AND METHOD OF USE THEREOF

(76) Inventor: David F Weber, 1611 Adams, Denver, CO (US) 80206

( * ) Notice: Subject to any disclaimer, the term of this patent is extended or adjusted under 35 U.S.C. 154(b) by 120 days.

(21) Appl. No.: 11/564,724

(22) Filed: Nov. 29, 2006

(65) Prior Publication Data
US 2007/0123363 A1 May 31, 2007

Related U.S. Application Data

(60) Provisional application No. 60/740,956, filed on Nov. 29, 2005.

(51) Int. Cl.
*B62J 9/00* (2006.01)
*B62J 7/06* (2006.01)

(52) U.S. Cl. .................. 280/288.4; 280/301; 224/429; 224/424

(58) Field of Classification Search ................ 280/202, 280/288.4, 293, 301, DIG. 6; 224/421, 424, 224/429, 430, 419; 473/131
See application file for complete search history.

(56) References Cited

U.S. PATENT DOCUMENTS

| | | | |
|---|---|---|---|
| 3,827,613 A * | 8/1974 | Meyer | 224/457 |
| 4,432,560 A | 2/1984 | Patrick | |
| 4,450,988 A * | 5/1984 | Meisel | 224/430 |
| 4,650,203 A * | 3/1987 | Tsutsumikoshi et al. | 280/269 |
| 4,770,326 A | 9/1988 | Thompson | |
| 5,207,361 A | 5/1993 | Slifka | |
| 5,402,923 A | 4/1995 | Snyder | |
| 6,227,426 B1 | 5/2001 | Martin et al. | |
| 6,330,944 B1 * | 12/2001 | DeMichele | 206/315.3 |
| 6,340,166 B1 * | 1/2002 | Rethman et al. | 280/293 |
| D514,648 S | 2/2006 | Sanders | |
| 6,994,359 B1 | 2/2006 | Silver | |

OTHER PUBLICATIONS www.surleybikes.com/pugsley.html. Frame designed to fit extra wide tires.

* cited by examiner

*Primary Examiner*—Tony H. Winner

(57) ABSTRACT

A system for carrying golf clubs on the front of a bicycle with extra wide tires, by dividing the clubs between two enclosures with 7 plastic tubes each to receive 14 golf clubs: one to the left of the bicycle's front fork and handlebar, and one to the right. This combination allows the golfer exercise while maintaining speed of play.

11 Claims, 7 Drawing Sheets

BICYCLE-MOUNTED GOLF CLUB CARRYING SYSTEM, COMBINATION WITH A BICYCLE HAVING EXTRA-WIDE TIRES AND METHOD OF USE THEREOF

REFERENCE TO RELATED APPLICATIONS

This application claim priority of U.S. provisional application No. 60/740,956 entitled "Golf club carrying system for bicycles" filed on Nov. 29, 2005 having the same inventorship as this application. The above referenced application is also fully incorporated by reference herein.

FIELD OF THE INVENTION

The present invention relates generally to bicycles and the game of golf.

BACKGROUND

When playing a typical game of golf, a player must transport both himself or herself and his or her golf clubs around a golf course. Traditionally, players either (i) walked the course carrying or pulling a golf bag that contained their clubs, or (ii) rode in a golf carts which also provided a space for their golf bags. Walking provides a player with a significant workout as he/she may traverse 4-5 miles over a typical 18 hole course; however, the pace of the game is reduced substantially and may hold up faster players, such as those using carts. Carts on the other hand open the game to those players that either do not want to or do not have the physical stamina to walk a golf course.

Others over the years have suggested using human powered bicycles and tricycles to transport the golfer and his golf clubs around the course. Typically, these have included provisions such as brackets, mounting apparatus and modified frames that permit a traditional generally cylindrical golf bag to be carried on the vehicle. While such vehicles do allow a rider to traverse the course, the addition of a golf bag to a bicycle for instance introduces significant stability problems that make them unsuitable and potentially dangerous for use by the occasional bicycle rider. One such bicycle and bracket combination is described in U.S. Pat. No. 4,387,836.

To improve the balance and stability of a golf club-carrying bicycle, a carrier that distributes the weight of the clubs on either side of a rear wheel was proposed in U.S. Pat. No. 4,770,326. Further, individual tubes are provided to house each club thereby preventing them from moving around as the bicycle is being ridden. This configuration, however, has several serious drawbacks. For instance, overall weight of the bicycle with the clubs and a rider is biased towards the rear wheel thereby creating a potential over steer condition, such as when descending a hill.

Another potentially more significant impediment to the use of bicycles on golf courses is the potential damage they can cause to golf course grounds. For one, a traditional bicycle or even a standard mountain bike with traditional "fat tires" leave unsightly tracks on the fairways that detract from the manicured image that the grounds keepers of many if not most golf courses. Further, when a course is rain logged and soft, the tread of a bike tire along with the higher than typical ground load can dig into the terrain and cause serious turf damage. Considering the foregoing, golf course managers are unlikely to allow bicycles on their courses severely reducing if not eliminating the economic viability of prior art bicycles designed to carry golf clubs.

DETAILED DESCRIPTION

Figure 1:
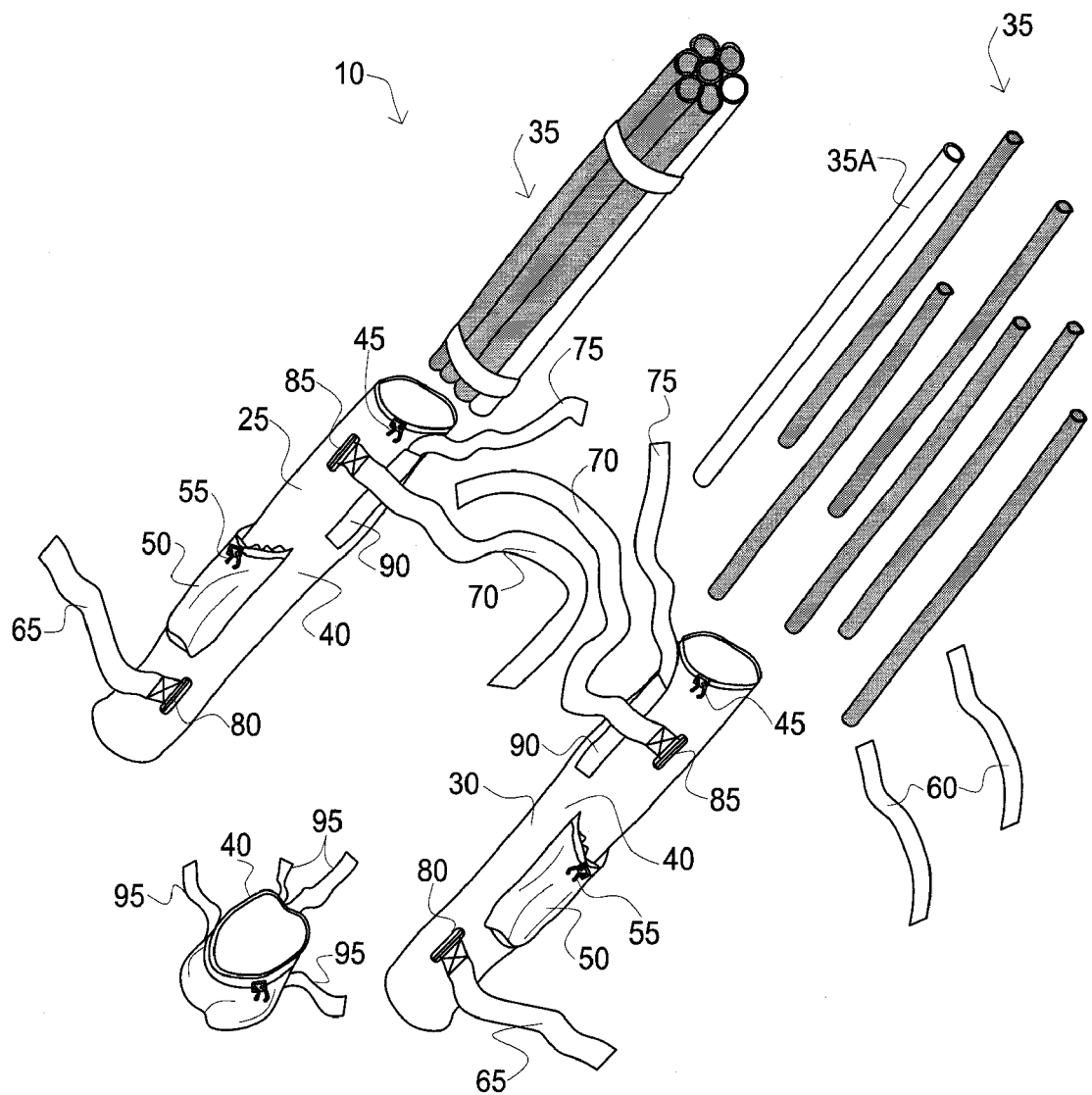
FIG. 1 is an exploded isometric view of a system for carrying golf clubs at the front end of a bicycle according to an embodiment of the present invention.

Embodiments of the present invention comprise a system for carrying a set of golf clubs on the front end of a suitable bicycle. Other embodiments comprise the system in combination with a bicycle designed to accommodate extra-wide (greater than about 2.9") tires. Yet other embodiments include a method of playing golf using the aforementioned combination of the system and the extra-wide tired bicycle.

One embodiment of the system comprises a pair of elongated bags and associated mounting hardware. Each bag is adapted to mount to the front end of a bicycle at or proximate the bicycle's handlebar and front fork such that the bags and their associated content turns in unison with the bicycle's front wheel.

Preferably, each bag comprises a main compartment in which a plurality of elongated plastic tubes can be placed. Each tube is adapted to receive a handle of a typical golf club therein. When the main compartment is filled with a predetermined number of tubes, the tubes are effectively held in place relative to the other tubes and the side(s) of the compartment. In one variation, the predetermined number of tubes in the main compartment of each bag is seven thereby providing a total of fourteen tubes to store fourteen golf clubs, the maximum number of clubs permitted under PGA rules.

In one embodiment, the majority of the elongated tubes are of the type known in the art for use with standard prior art golf bags and typically comprise relatively thin walled polyethylene or similar plastic material. These tubes are relatively flexible especially along their lengths yet they are extremely economical. To provide additional stiffness to the associated bag and tube combination one or more of the elongated tubes can comprise a more rigid plastic tube, such as a tube comprised of a thicker PVC material. Typically, but not necessarily, one of the stiffer plastic tubes will be located on an inside edge of the main compartment that is adapted to be the portion of the bag's main compartment closest to an associated bicycle's fork and stem when attached thereto.

In addition to the main compartments, one or more peripheral compartments can be provided on embodiments of the bags for containing other items used in the game of golf, such as but not limited to, golf balls, tee, gloves and score cards.

The peripheral compartments can also be used to store other items generally unrelated to the play of golf such as a wallet or small purse, keys and a beverage container.

In one embodiment, each bag of the pair is completely separate from the other bag and includes its own means of attachment to the bicycle. In at least one variation, each bag includes top and bottom hook and loop straps that wrap around a fork blade and the handlebar respectively to secure the bag to the bicycle. A separate center bag may also be provided that can be located between the pair of bags when the three bags are attached to a bicycle. The center bag and each of the pair of elongated bags can include hook and loop material to couple the bags together. Further, variations of the center bag can include straps to secure it to a bicycle stem or handlebar. The center bag can be utilized to carry any number of items as the user sees fit.

In yet another embodiment, the pair of bags are physically coupled, such as by a strip of fabric or other material or by way of a center bag. Each of the elongated bags will typically have lower attachment means, such as hook and loop straps, but all three bags (assuming a center bag) may use the same attachment means, such as a single pair of hook and loop straps, to secure the system to an associated bicycle.

No matter which embodiment or variation of the system utilized in connection with a bicycle, the placement of the golf club carrying system to the front of the bicycle ameliorates many of the problems associated with prior art devices. For instance, the potential over steer condition is reduced if not eliminated and the overall stability of the bicycle and golf club combination is enhanced. By placing each club in separate tubes and balancing the number of clubs on either side of the bicycle's front fork, the load can be evenly balanced so that the center of gravity of the loaded golf club carrying system is located proximate the left to right center of the front wheel's axle. Further, more by placing the clubs in individual tubes where they are prevented from moving significant amounts from side to side, the weight distribution of the bicycle and golf club combination remains relatively stable during turning, ascents and descents.

The mounting means used to attached the system to a bicycle can be specific to a particular design of bicycle or to specific mounting brackets coupled to a bicycle or the mounting means of the system can be adaptable to mounting on a large number of different bicycles, such as when certain variations of hook and loop straps are utilized. Accordingly, variations and embodiments of the system can be mounted to mountain bikes, cruisers, racing bikes, and even adult tricycles. While the golf club carrying system is fully functional in combination within any suitable bicycle, most bicycles with standard diameter wheels will cause excessive loading on golf course fairways and as such may not be approved for use on a particular golf course by the golf course's managers.

However, in a combination comprising one of the embodiments or variations of the golf bag-carrying system and a bicycle having extra-wide tires, the loading of the bicycle when laden with both a rider and his/her clubs is reduced to a level comparable with or below that of a typical golf cart, such as the club car brand of golf carts. A number of golf course managers have permitted the extra-wide tired bicycle and club carrying system combination to be used on their fairways after witnessing a demonstration of the minimal impact the combination has on the grass surfaces. In contrast, golf courses approached about permitting a standard fat-tired mountain bike to be used on the fairways [turned]refused the request.

Further, the wide tires further increase the stability of the bicycle making the combination suitable for users who are not regular bicycle riders. The inherent stability and ease of use of the bicycle combination in conjunction with the game of golf was field tested by numerous individuals in 2006. In general, the users indicated the bicycle combinations worked well and made the game more enjoyable. A number of the users expressed a desire to use the bicycles again the next time they played golf.

When a user gets off the bicycle combination to hit a ball, a kickstand is provided to keep the bicycle upright. Traditional prior art kickstands have relatively small ends that could dig into or even sink into a fairway or grass surface causing the bicycle to tumble and/or causing damage to the ground surface. Accordingly, a prior art kickstand may not be welcome on a golf course by grounds keepers. Without a kickstand, a user will have to lay his/her bicycle down on to the ground every time he/she gets off the bicycle to hit a golf ball. Repeatedly laying the bicycle down and lifting it up can detract from a user's enjoyment of the game and may even prevent a user from cycling a golf course instead of using a cart or walking.

Another embodiment of the present invention comprises a modified kickstand that can be utilized with (i) any bicycle wherein support on a relatively soft surface is desired or (ii) the aforementioned combination of the extra-wide tired bicycle and the golf club carrying system. Simply the end of the kickstand that contacts the ground comprises the head of a wood-type golf club or a facsimile thereof. The wide bottom surface area of the club head supports the bike on ground that a prior art kick stand would sink into. Further, the look of the kickstand is aesthetically pleasing to golf aficionados.

Terminology

The terms and phrases as indicated in quotes ( . . . ) in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase. The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or a direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

As used herein, the terms "bicycle" and "bike" are used interchangeably.

The term "handlebar" as used herein refers to the any device used to steer a bicycle or, as applicable, any other human powered vehicle. The term "stem" refers to the device used to connect the handlebar to the front fork of a bicycle. The term "fork" or more specifically "front fork" refers to the pivotal portion of a bicycle attached to the front wheel that facilitates steering of the bicycle or other human powered vehicle.

Figure 2:
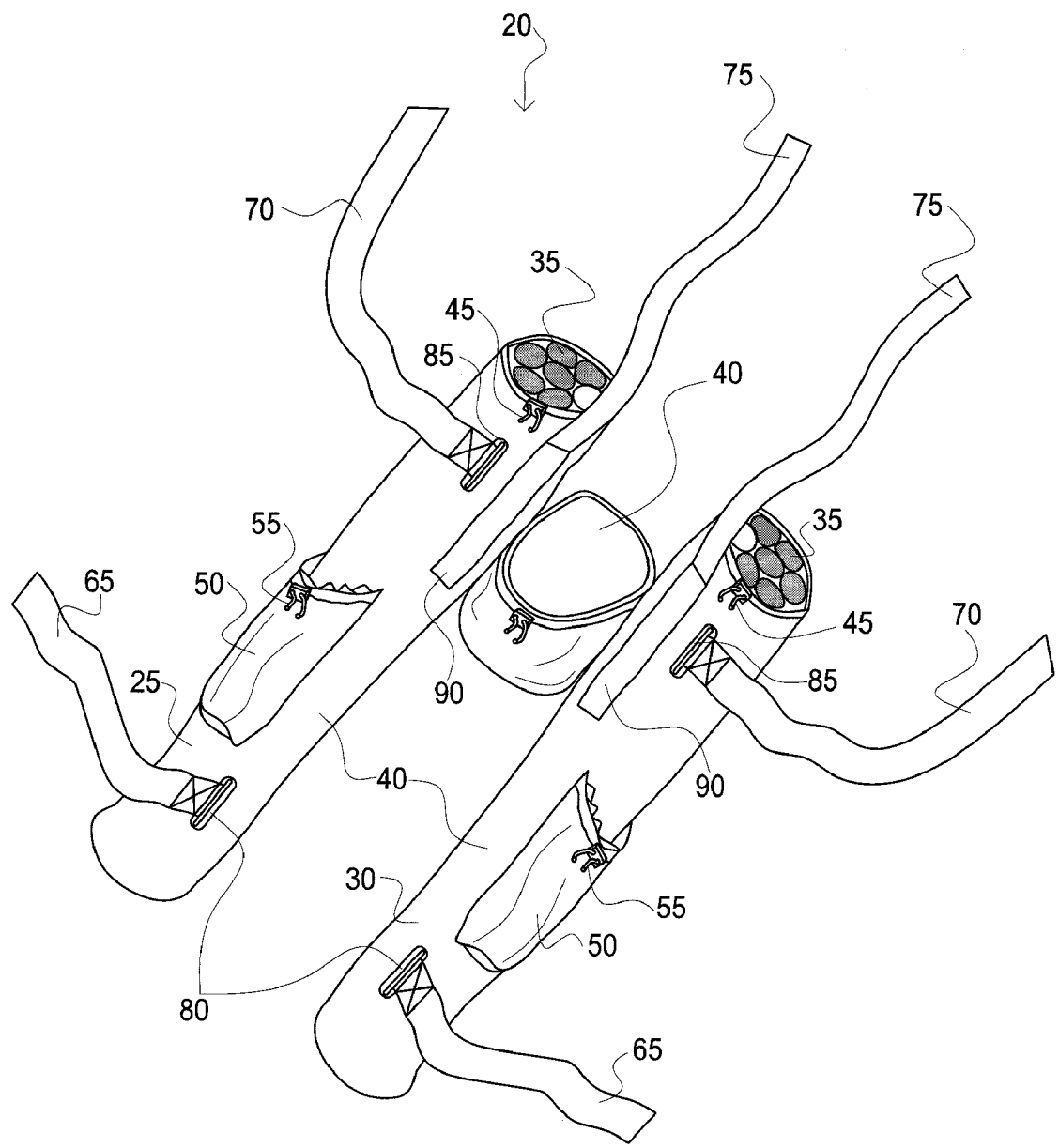
FIG. 2 is an isometric view of a system for carrying golf clubs on the front end of a bicycle according to another embodiment.

A System for Carrying a Set of Golf Clubs Attached to a Bicycle According to Several Embodiments Referring to FIGS. 1 & 2 variations of a system 10&20 for carrying a set of golf clubs on a bicycle are illustrated. In general, the system comprises: (i) left and right elongated enclosures 25&30 (or bags); (ii) a plurality of elongated tubes 35 that are received in the respective enclosures; (iii) means for securing the bags to the front end of a bicycle, typically the front fork, the handlebar and the handlebar stem; and (iv) optionally, a center bag 40.

In the variation illustrated in FIG. 1, the left and right enclosures 25&30 as well as the optional center bag 40 are separate and distinct from each other and are separately attached to an associated bicycle. In the variation of FIG. 2, the left and right enclosures are coupled via the center bag to which each are sewn or otherwise fastened. In other variations, the two enclosures can be coupled by way of a strap or another type of connector.

The enclosures 25&30 can be made from any suitable material including flexible and rigid plastic but is typically comprised of a woven fabric 40. One variation the woven fabric is comprised of cotton or cotton-blend fibers. In yet other variations, the fabric is comprised of polymeric fibers, such as nylon. Further, the enclosures can comprise a combination of materials and structures. For instance, a plastic framework, either internal or external can be provided to support associated fabric material. In the illustrated variations, the enclosures are comprised substantially of fabric and the associated tubes 35 provide the structure necessary to support and provide rigidity to the enclosure.

As shown, the enclosures comprise a primary or main elongated compartment with an upwardly facing opening and a body that extends about 70-90% the length of a typical golf club terminating in a closed bottom end. The main compartment is generally cylindrically shaped although in variations any suitable shape can be used. The open end of the main compartment may include a drawstring 45 that extends around it periphery to permit the end to be tightened around the plurality of associated tubes. In variations, the drawstring can be replaced with an elastic band, a strap, snaps, hook and loop material, buckles, buttons or any other suitable adjustment means for varying the size of the opening or cinching it around the enclosures contents.

One or more peripheral compartments 50 can be attached to the exterior of the bag to permit a user to carry items other than golf clubs that may be related to the play of golf. For instance, the peripheral bags can be used to store golf galls, scorecards, pencils, keys, wallets, beverages, jackets, sweaters, tees and/or golf shoes therein. In the Figures, a single peripheral compartment is provided on each of the left and right enclosures generally opposite the portion of the enclosure that is in direct contact with the front fork of the associated bicycle. The peripheral compartment, as shown, is comprised of one or more pieces of fabric that our sewn or otherwise attached to the exterior surface of the main compartment. The top opening of the peripheral compartments include a draw string closure 55 but any suitable type of closure may be utilized including but not limited to hook and loop material, a zipper, snaps, buttons, straps and buckles or D-rings. Further, although the peripheral compartment is fixedly attached to the main compartment in the Figures, variations are contemplated wherein the peripheral compartments may comprise distinct bags that are attached by way of zippers or hook and loop material patches. It is to be further appreciated that the number of peripheral compartments can vary depending on a particular embodiment or variation of the respective left or right enclosure.

Referring to FIG. 1, a plurality of elongated plastic tubes 35 are provided for placement in the main compartment wherein each tube is adapted to receive the shaft of a golf club therein. In one preferred variation at total of seven tubes are provided for each of the main compartments thereby permitting the regulation number of 14 clubs to be transported by way of the bicycle. The tubes substantially fill the entire main compartment giving the enclosure both form and rigidity. The majority of the tubes are typically of the standard type commonly known and sold for use in traditional golf bags. They are typically comprised of a very thin wall of polyethylene or polypropylene and as such are not particularly rigid or stiff but are both lightweight and very economical.

To provide additional longitudinal stiffness to each enclosure, a stiffer more stout tube 35A is also provided in certain variations. The stouter tube typically has a similar inside diameter as the other tubes but is substantially thicker and therefore much stiffer. In some variations, at least one of these stouter tubes is typically placed closest to the portion of the enclosure that braces against the front fork of the bicycle to help prevent movement of the enclosures relative to the bicycle while it is being ridden. In one variation, the stouter tube is comprised of an ABS or PVC plastic and has a thickness of about 0.050-0.125 inches.

In some variations, the tubes 35 are all independently placed in the main compartment and collectively they fill the substantial majority of the volume of the compartment. The tension and compressive forces in play between the various tubes and the fabric wall of the main compartment generally act to hold the tubes in place relative to each other. However, in other variations the plurality of tubes from each compartment are independently secured and/or coupled to each other. As illustrated in FIG. 1 for instance, the tubes are held together with one or more straps or pieces of duct tape 60. In variations wherein the tubes are all comprised of a similar thermoplastic material, they can be fused or welded together. In other variations, bracket(s) can be provided that hold the various tubes in place. In yet other variations, the individual tubes can be replaced altogether with an internal framework that may or may not include individual compartments and/or openings for each club.

The illustrated means for securing the enclosures 25&30 to the bicycle comprises a plurality of hook and loop straps in the illustrated embodiment of FIGS. 1 & 2. However, in variations and other embodiments other means can be used for the same purpose. For instance, rigid brackets can be provided for attachment to the bicycle's fork and handlebar/stem that interface with framework provided on the enclosures. The brackets can be designed to permit easy removal of the enclosures or they may provide a more permanent mount.

The number of and general configurations of the straps illustrated in the Figures can vary substantially as well. Snaps, buckles, and buttons can replace the hook and loop material. The location of the straps can change as well. For instance, wherein the enclosures are coupled to each other, such as through a center bag 40 as shown in FIG. 2, a single set of straps instead of separate sets of straps to attach the integrated system to the handle and/or stem of the bicycle may be provided.

Referring to the mounting means of FIGS. 1 & 2, three straps 65, 70 & 75 are provided for each enclosure 25&30. The bottom lateral strap 65 is comprised of a fabric material with a loop material surface on all or a portion of one side surface and a hook material surface on all, or more typically the end portion, of the other surface. A proximal end of the strap is sewn, riveted or otherwise secured to the fabric of the main compartment. In variations that have an internal rigid framework, the strap proximal end may also be secured to the framework. A D-ring 80 is also attached to the enclosure proximate the straps distal end. In use, the strap is wrapped around the fork and the body of the enclosure and the distal end is passed through the D-ring 80 and folded back over on to itself to secure the hook material to the loop material. Depending on the length of the strap and the desires of the user, the strap can be wrapped around the fork blade and/or enclosure multiple times.

Top lateral strap 70 is also comprised of a fabric material with a loop material surface on all or a portion of one side surface and a hook material surface on all, or more typically the end portion, of the other surface. Likewise, a proximal end of the strap is sewn, riveted or otherwise secured to the fabric of the main compartment. A D-ring 85 is also attached to the enclosure proximate the straps distal end. The strap is used in a generally similar manner as the bottom lateral strap except the strap is wrapped around one or both the bicycle's handlebar and/or stem before being passed through the D-ring and secured in place. Typically, the strap is wrapped around the handlebar/stem multiple times.

The generally vertical top strap 75 is also comprised of a fabric material wherein the distal end includes a hook material portion in one surface. The proximal end of the strap is sewn or otherwise secured to the enclosure. Further, a strip of vertically-extending loop material 90 is secured to the enclosure and extends downwardly from the proximal end of the vertical top strap. In use, the vertical top strap is wrapped around the handlebar and/or stem several times and the hook surface of the distal end of the strap is secured to the loop material. When all three straps for each enclosure are properly secured to the front fork and handlebar/stem of the bicycle, the system 10 & 20 is firmly held in place on the bicycle.

A center bag 40 can be provided with the system that is typically located between the left and right enclosures 25&30. In the one embodiment of FIG. 1, the bag is separate and distinct from either of the enclosures and is attached to a bicycle's handlebar and/or stem by way of one or more straps 95. Typically, the straps use a hook and loop material to secure them together; however, variations may use buckles, snaps, buttons or any other suitable means. In the embodiment illustrated in FIG. 2, the center bag is secured to both the left and right enclosures and does not have its own attachment system. The center bag is typically sewn to the fabric outer bags of the left and right enclosures, although it may be attached by any suitable means whether permanent or removable.

Figure 3:
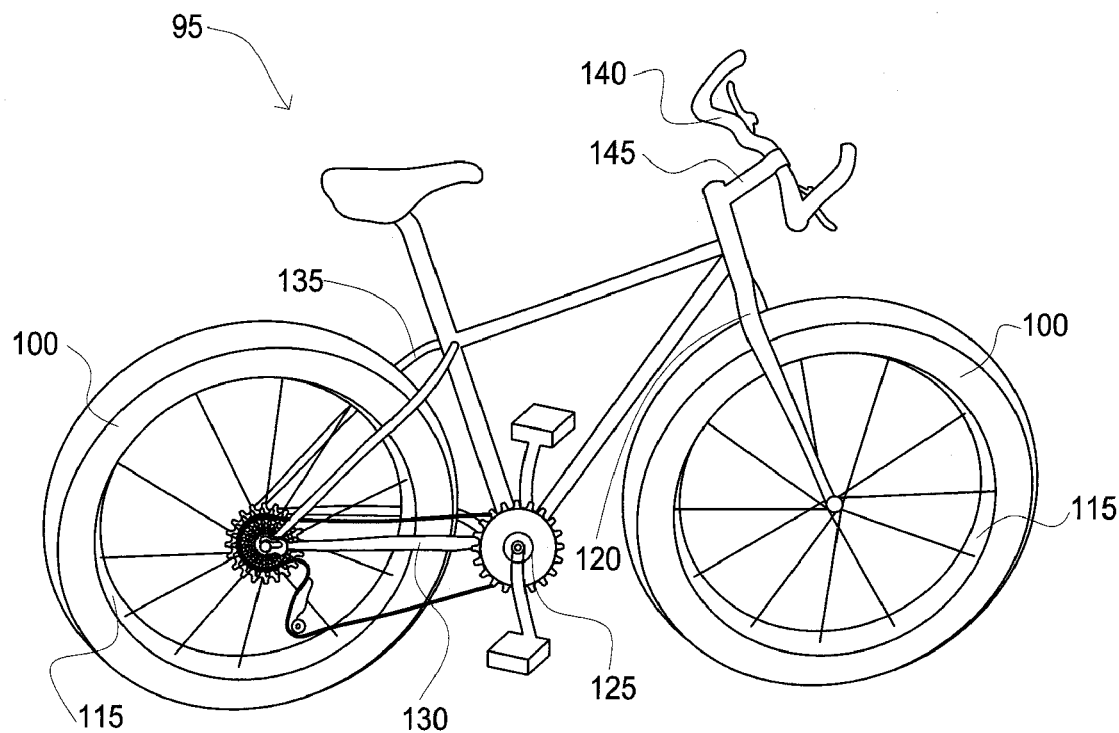
FIG. 3 is an isometric view of a bicycle having extra-wide tires according to one embodiment of the present invention.

A Combination of a Bicycle-Mounted Golf Club Carrying System and an Extra-Wide Tired Bicycle According to One Embodiment FIG. 3 is an illustration of a mountain or all-terrain bicycle 95 that has extra-wide tires 100 that provide a much wider and larger footprint than a traditional mountain bike tire.

Figure 4:
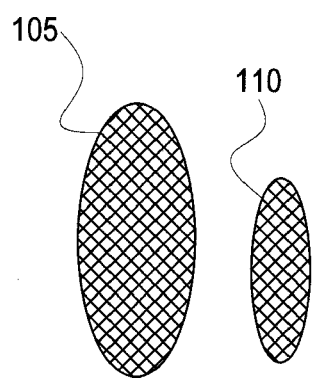
FIG. 4 is a depiction of the contact patch area of an extra-wide bicycle tire and a traditional bicycle fat tire according to an embodiment of the present invention.

Traditional mountain bikes can typically accept tires up to about 2.3" wide, with 2.1" wide tires being the largest commonly used on these bikes. These tires must be run at tire pressures of 30-35 psi (or 20-25 psi for tubeless variants). In contrast, the tires 100 on an extra-wide tired mountain-style bike are greater than 3.0" in width, more preferably greater than 3.3 in width and most preferably greater than 3.6". A 3.7" wide tire marketed by Quality Bicycle Products, Inc of St. Bloomington, Minn. under the Surly. RTM. brand can be normally be run at pressures as low as 12 psi and in some cases as low as 8-9 psi. Referring to FIG. 4, a representative facsimile of the contact patch area 105 of a 3.7" tire at about 12 psi is compared to the contact patch 110 of a 2.1" tire at 30 psi. The 3.7" tire contact patch is about 4.0-4.5" wide and about 6.0-7.0" long whereas the contact patch of a traditional fat tire is about 2.2-2.5" wide and about 3.0-4.0" long. The extra-wide tire has a footprint about 2.5 to 5.0 times greater than a traditional fat tire.

Whereas a mountain bicycle with a typical pair of traditional fat tires has a much greater impact on terrain and fairway turf than a traditional golf cart, such as a club car, the extra-wide tired bicycle's impact is substantially less than that of a loaded club car as is indicated in the following paragraphs.

A typical club car golf cart weighs about 1250 pound when loaded with two riders and their golf bags. The four tires of the golf cart have about 176 square inches of contact area with the ground. Accordingly, the average impact on the terrain from the club car is about 7 pounds per square inch.

A typical mountain bicycle with traditional 2.1" fat tires weighs about 230 pounds including a rider and golf gear. The two tires have a total contact area of about 25 square inches. Accordingly, the average impact on the terrain from the bicycle is about 9 pounds per square inch.

An extra-wide tired bicycle with 3.7" diameter tires weighs about 240 pounds fully loaded with a rider and golf gear. The two extra-wide tires have a contact area of about 50 square inches. Accordingly, the average impact on the terrain from the bicycle is about 5 pounds per square inch.

As is evident from the exemplary numbers the impact of an extra-wide tired bike 95 with 3.7" wide tires is substantially less than the impact of a golf cart. Furthermore, for a bike with 3.0" or wider tires the impact of the bicycle is about the same or less than that of a typical golf cart. Accordingly, there would be little basis for a grounds keeper of a golf course to prohibit the use of a extra-wide tired bike with the golf club carrying system for use on his/her course especially if the course, as most courses, allows golf carts to traverse the fairways. In contrast, a traditional mountain bicycle with traditional fat tires has about 30% greater the impact compared with a golf cart.

An extra-wide tired bicycle is generally similar to a traditional mountain bike or cruiser-style bicycle; however, suitably modified to permit the fitment of the much larger than typical tiers. One of the differences includes larger wheel rims to accommodate the large tires. One such rim is the Large Marge rim marketed by Surly Bicycles, Inc., which has a crosswise width of about 2-3 inches compared with the 1.25-1.75" crosswise width of most mountain bicycle rims.

Other differences can, but do not necessarily, include: (i) front fork blades that are spaced farther apart than typical with a 120-135 mm dropout spacing instead of the standard 100 mm spacing along with a wider front wheel hub; (ii) a 100 mm wide bottom bracket shell 125 in contrast to the traditional 68 mm or 73 mm shell; and (iii) chainstays 130 and seat stays 135 that are spaced further apart than traditional mountain bicycle chain stays and seat stays proximate the location wherein the rear wheel's tire passes through.

In other respects, the configurations of various extra-wide tired bicycles can vary drastically and significantly, both among various extra-wide tired models and other traditional bicycles. For instance, some may have traditional rear derailleurs with rear freewheeling cogs for changing gear ratios; whereas, others may have internally geared hubs. Some may have front derailleurs to move the drive chain among a plurality of front chain rings and others may completely forgo a front gear changer. Different variations may have disk or cantilever brakes or a combination thereof. Some bicycles may be configured more like a mountain bicycle; whereas, others will be configured more like a cruiser or a traditional upright bicycle. Some bicycles may include front and/or rear suspensions while others do not. Further, on some variations, brackets may be built into or installed on the front fork, the stem 140 and/or the handlebar 145 to facilitate the attachment of the golf club carrying system described and claimed herein.

No matter the general configuration of the bicycle, some preferred variations will have a chain guard, whether the type attached to the frame of the bicycle or the type coupled to the front chain ring to protect a golfer's pants from being damaged and/or marked with grease. Additionally, the same or other variations will also include front and/or rear fenders to prevent mud and/or water from splashing onto the rider. In at least one variation, the rear fender is also a rear rack that has an additional compartment attached thereto wherein a golfer may store additional items such as a coat, a rain poncho or a sweater.

Figure 5:
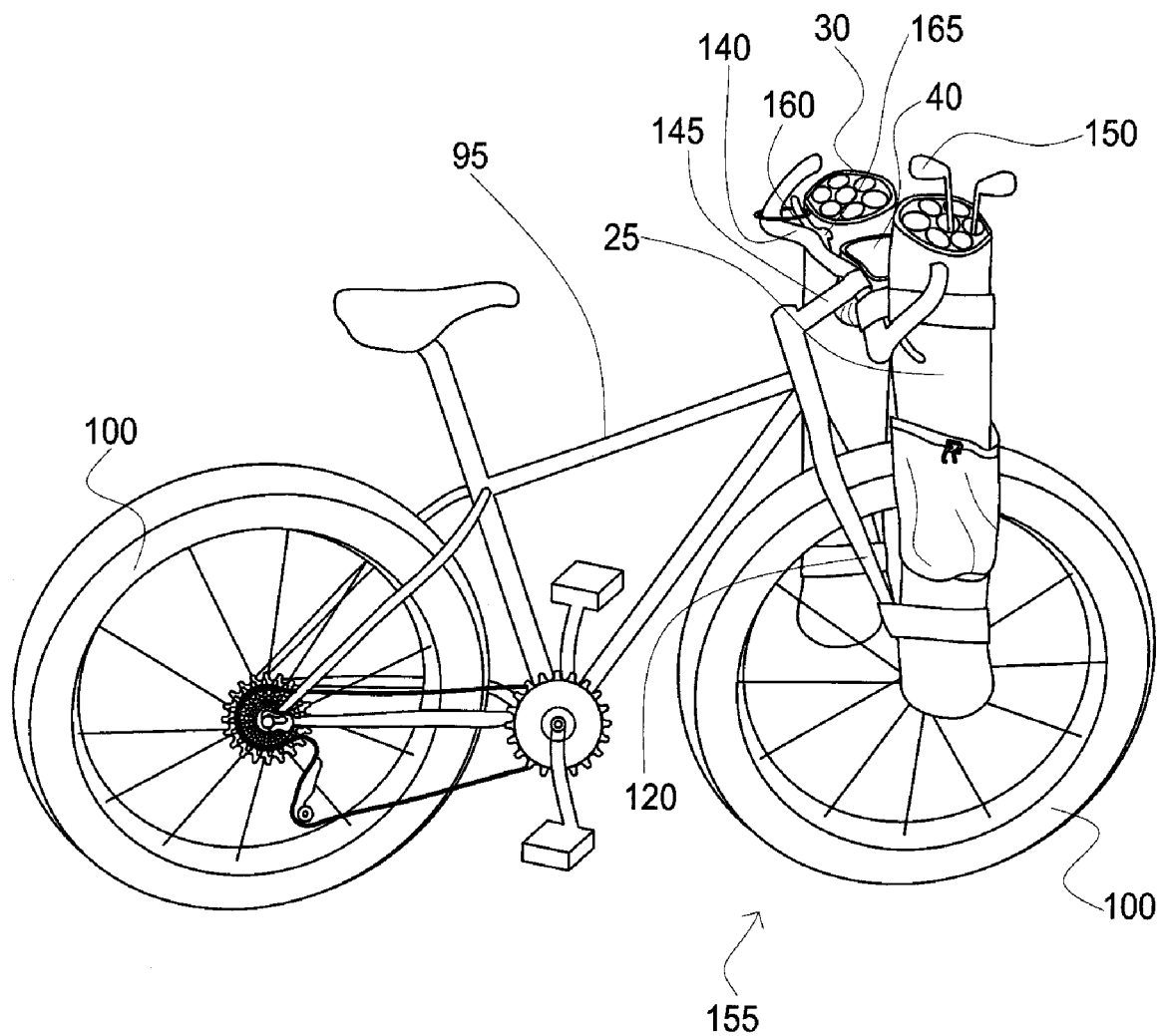
FIG. 5 is an isometric side view of a bicycle with extra-wide tires and a system for carrying golf clubs attached thereto according to an embodiment of the present invention.
Figure 6:
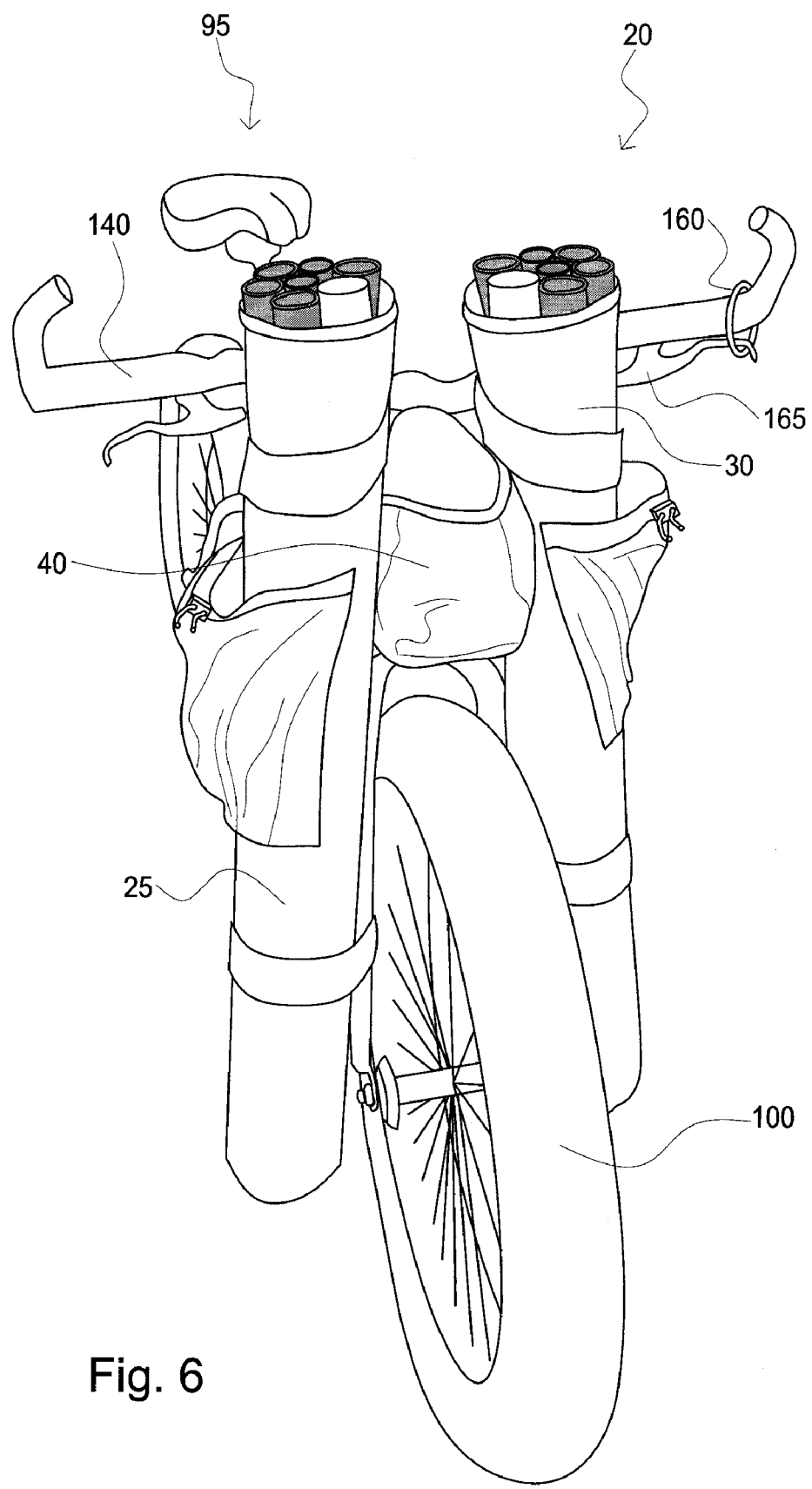
FIG. 6 is an isometric front view of a bicycle with extra-wide tires and a system for carrying golf clubs attached thereto according to an embodiment of the present invention.

FIGS. 5-6 illustrate the combination of an extra-wide tired bicycle and the golf club carrying system from several different viewpoints. Both Figures illustrate a golf club carrying system comprising left and right elongated enclosures and a center enclosure that are mounted to the handlebar 140 and/or stem 145 as well as the left and right fork blades 120 of the bicycle. Accordingly, the system including the golf clubs 150 and any other items contained in the system's various compartments turns in unison with the front wheel 155.

Referring specifically to FIG. 6, a relatively small loop of elastic cord 160, such as bungee cord, is provided on the left distal portion of the handlebar 140. When a golfer is stopped and dismounts his/her bike, he/she can place the loop over and around both the handlebar and the distal portion of the left brake lever 165 to pull the brake lever towards the handlebar. This activates the front brake caliper, whether it is a disk brake cantilever brake or other type of brake, to prevent the front wheel from rolling and/or pivoting. Simply, by holding the front brake in the activated position when a golfer is dismounted from the bike and the bike is held in the upright position by a kickstand, the stability of the parked bike is enhanced.

Figure 7:
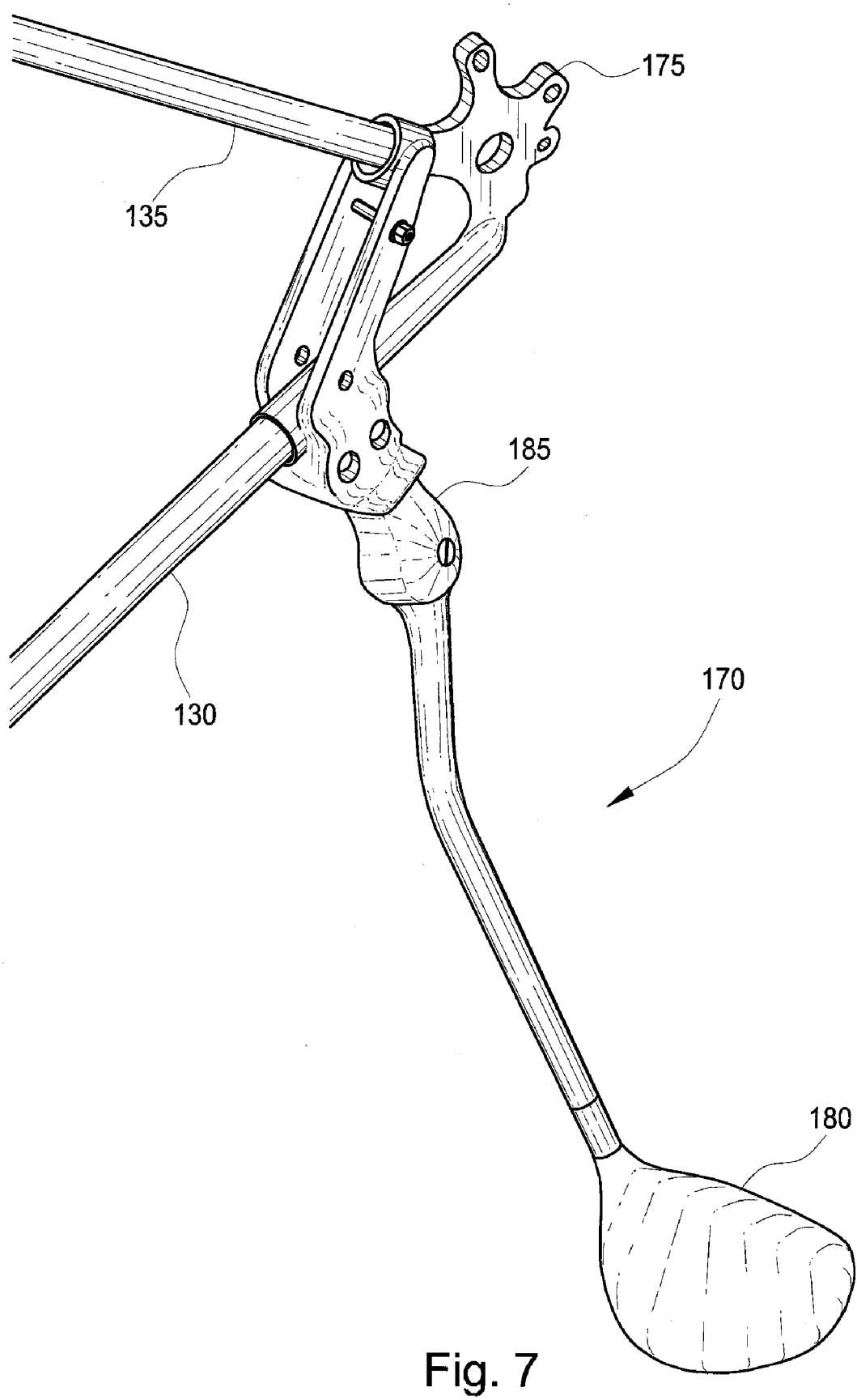
FIGS. 7 & 8 are isometric views of a bicycle kickstand having an end resembling the head of a wood-type golf club of a bicycle with extra-wide tires and a system for carrying golf clubs attached thereto according to an embodiment of the present invention.
Figure 8:
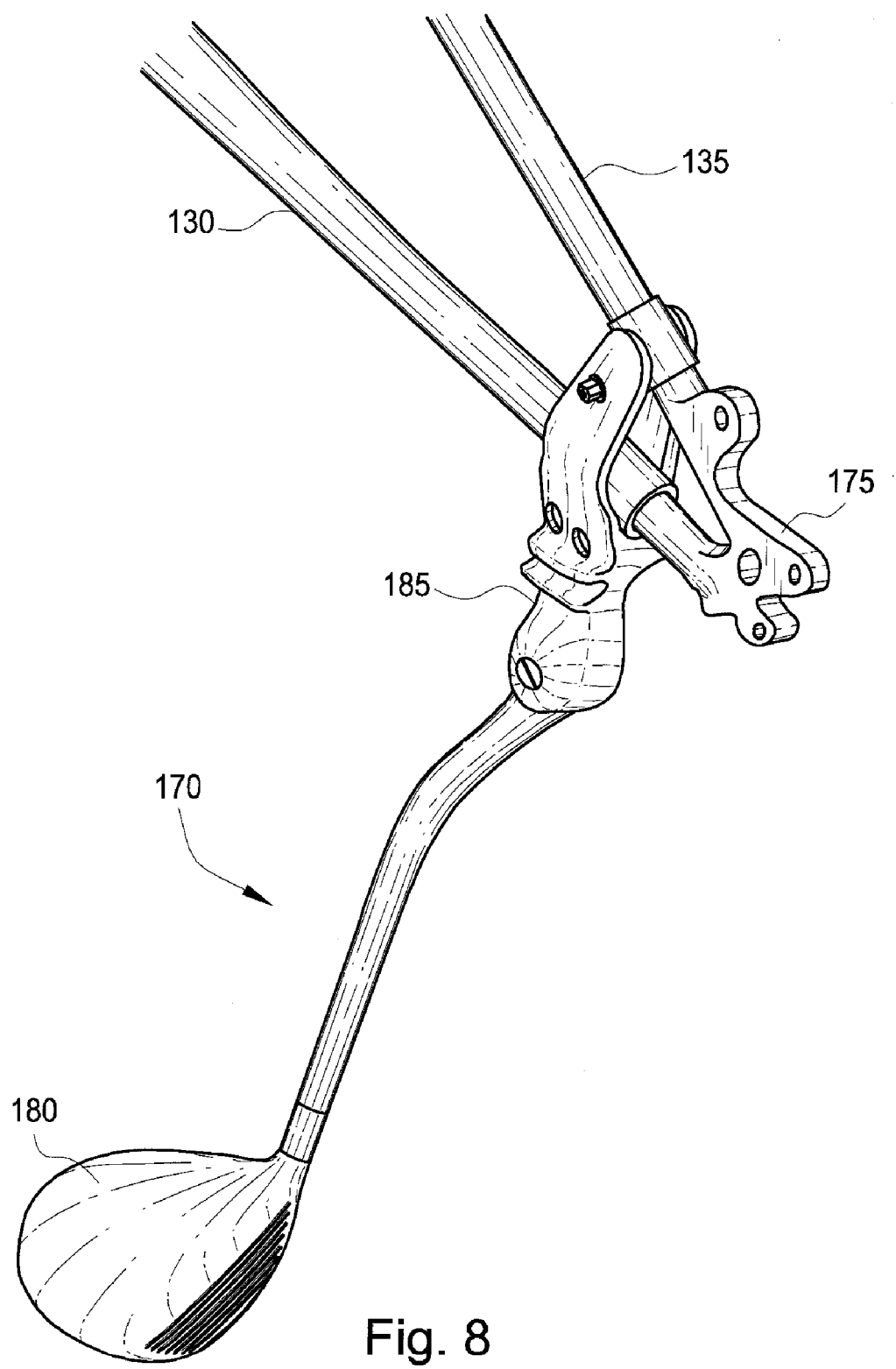

FIGS. 7&8 are different views of a kickstand 170 that is attached to the bicycle frames left chain and seat stays 130& 135 proximate the rear wheel dropouts 175. Instead of comprising a beveled end that has a surface area of well less than a square inch, the end of the illustrated kickstand that comprises an embodiment of the present invention has a relatively large end surface area to facilitate supporting the bicycle on soft surfaces. More specifically, the end or distal portion of the kickstand comprises a head of a wood-style golf club 180. It is appreciated that the wood-style golf club head need not comprise a wooden material but rather merely describes a particular type of golf club head. As shown, the kickstand has a contact surface of at least three square inches, more preferably at least four square and most preferably at least five square inches.

In variations of the kickstand, the end may comprise a portion that is a facsimile of a wood-style golf club head instead of an actual golf club head. The orientation of the head can vary relative to the bicycle. Further, the mechanism 185 related to the kickstand's attachment to the bicycle can vary as well. Simply, in addition to the advantages provided by specifying a kickstand with an end having a large bottom surface area, the aesthetic characteristics of a wood-style golf club kickstand end is also unique regardless of the type of kickstand to which the end is attached.

Other embodiments of the kickstand can include ends that are reminiscent of the heads of other types of golf clubs, such irons or putters. In yet other embodiments, the end can be more utilitarian with a shape designed primarily for providing a kickstand to ground contact patch much larger than prior art stands.

The various embodiments and variations thereof illustrated in the accompanying Figures and/or described above are merely exemplary and are not meant to limit the scope of the invention. It is to be appreciated that numerous variations of the invention have been contemplated as would be obvious to one of ordinary skill in the art with the benefit of this disclosure.

For instance, the system for carrying golf clubs on the front of a bicycle can comprise a plurality of tubes sans the cloth enclosures wherein the bottom end of the tubes are closed and the tubes attach to bicycle by way of brackets and/or straps that attach to the each of the right and left set of tubes. On specially designed bicycles, the frames, front forks, handlebars and/or stems can have slots or brackets attached or configured thereon to facilitate the attachment of the system to the bicycle. In other embodiments, the tubes used to keep the various clubs separate from each other can be replaced with other means to keep the clubs from knocking against each other during transport, such as a molded plastic top end that defines a plurality of individual openings. While it is generally desirable to prevent the clubs from shifting during riding to prevent any adverse affect on bicycle handing, variations and embodiments are contemplated wherein there is no means whatsoever to divide the clubs within the left and right enclosures.

I claim:

1. A combination comprising:
a bicycle, the bicycle having at least a frame, rear wheel and a front end, the front end being pivotally coupled to the frame and including a front wheel, a front fork, a handlebar, a stem, and a kickstand a, each of the front and rear wheels further including an extra-wide tire, the extra-wide tire having a tread width equal to or greater than 3.5 inches; a system for carrying golf clubs coupled to pivot in unison with the front end of the bicycle, the system including two sets of seven plastic tubes enclosed in a suitable material,: (i) a first enclosure coupled to the left side of the bicycle handlebar and fork, and (ii) a second enclosure coupled to the right side of the bicycle handlebar and fork, each enclosure including an upwardly facing opening to receive a plurality of golf clubs; and one or two of the elongated tubes has a flexural stiffness of at least fifty percent greater than the remainder of the tubes.

2. The combination of claim 1, wherein a contact patch area of each of the extra wide tires of the front and rear wheels is at least 18 square inches when loaded with a set of 14 golf clubs and the bicycle is ridden by a rider weighing at least 180 pounds.

3. The combination of claim 1, wherein the tread width of the tires is greater than or equal to 3.5 inches.

4. The combination of claim 3, wherein each extra wide tire of the front and rear wheels is pressurized to no more than about 14 pounds per square inch.

5. The combination of claim 1, wherein each the left and right enclosures of the system contain a set of seven elongated tubes being the correct length and diameter to receive a golf club in each tube.

6. The combination of claim 1, wherein each set of elongated tubes comprises at least seven tubes.

7. The combination of claim 1, further including a kickstand, the ground contact surface being at least two square inches when deployed.

8. The combination of claim 7, wherein the end of the kickstand resembles the head of a golf club.

9. The combination of claim 8 further including a regulation set of 14 golf clubs divided into two enclosures of seven clubs each.

10. The combination of claim 1, wherein each of the two enclosures will include at least one compartment for golf balls and other accessories.

11. a The combination of claim 1, wherein a small bag for accessories is fitted between the two enclosures at the top end providing spacing and further means of attachment.

* * * * *